United States Patent
Wurz et al.

(10) Patent No.: US 8,110,790 B2
(45) Date of Patent: Feb. 7, 2012

(54) LARGE DEPTH OF FIELD LINE SCAN CAMERA

(75) Inventors: David A. Wurz, Doylestown, PA (US); Thomas J. Brobst, Allentown, PA (US); Christopher Alan Freyman, Alburtis, PA (US)

(73) Assignee: Accu-Sort Systems, Inc., Telford, PA (US)

( * ) Notice: Subject to any disclaimer, the term of this patent is extended or adjusted under 35 U.S.C. 154(b) by 92 days.

(21) Appl. No.: 12/562,478

(22) Filed: Sep. 18, 2009

(65) Prior Publication Data

US 2010/0006742 A1    Jan. 14, 2010

Related U.S. Application Data

(63) Continuation of application No. 11/559,669, filed on Nov. 14, 2006, now abandoned.

(60) Provisional application No. 60/737,118, filed on Nov. 16, 2005.

(51) Int. Cl.
*G06M 7/00* (2006.01)

(52) U.S. Cl. .............. 250/224; 250/206.1; 250/222.1; 359/202.1; 359/203.1

(58) Field of Classification Search .......... 250/206.1, 250/222.1, 224; 359/202.1, 203.1
See application file for complete search history.

(56) References Cited

U.S. PATENT DOCUMENTS

| | | | |
|---|---|---|---|
| 3,912,922 A | 10/1975 | Lacotte et al. | |
| 3,989,947 A | 11/1976 | Chapman | |
| 4,404,594 A | 9/1983 | Hannan | |
| 4,457,580 A | 7/1984 | Klose | |
| 4,667,255 A | 5/1987 | Lindberg | |
| 4,672,458 A | 6/1987 | McKechnie | |
| 4,798,947 A | 1/1989 | Baxter | |
| 4,829,171 A | 5/1989 | Katsumura | |
| 4,833,724 A | 5/1989 | Goel | |
| 4,841,147 A * | 6/1989 | Saotome | 250/585 |

(Continued)

FOREIGN PATENT DOCUMENTS

EP    0851376 A1    7/1998

(Continued)

OTHER PUBLICATIONS

European Search Report dated Oct. 15, 2008.

(Continued)

*Primary Examiner* — Georgia Y Epps
*Assistant Examiner* — Kevin Wyatt
(74) *Attorney, Agent, or Firm* — Nelson Mullins Riley & Scarborough, LLP

(57) ABSTRACT

A system for imaging an object comprising a surface for receiving the object to be imaged and an imaging device. The imaging device comprises a housing and a fixed focusing optical device mounted to the housing, whereby the fixed focusing optics comprises a lens for focusing light reflected from the object. A plurality of independent linear imaging sensors are positioned in the housing at different distances from the fixed focusing lens so that a face of each of the plurality of independent linear imaging sensors is aligned parallel to the surface. A processor is coupled to the plurality of independent linear imaging sensors for receiving an output signal from each of the plurality of independent linear imaging sensors representative of the reflected light. The lens defines a plane parallel to the surface, and the plurality of independent linear imaging sensors are adapted to receive reflected light from the object.

17 Claims, 14 Drawing Sheets

U.S. PATENT DOCUMENTS

| | | | |
|---|---|---|---|
| 4,939,369 A | 7/1990 | Elabd | |
| 4,963,756 A | 10/1990 | Quan et al. | |
| 4,965,840 A | 10/1990 | Subbarao | |
| 5,025,313 A | 6/1991 | Parulski et al. | |
| 5,196,696 A * | 3/1993 | Lindacher | 250/236 |
| 5,231,443 A | 7/1993 | Subbarao | |
| 5,245,172 A | 9/1993 | Esslinger et al. | |
| 5,308,966 A | 5/1994 | Danielson et al. | |
| 5,442,167 A | 8/1995 | Cornelius et al. | |
| 5,485,263 A | 1/1996 | Bjorner et al. | |
| 5,521,366 A | 5/1996 | Wang et al. | |
| 5,521,700 A | 5/1996 | Kajino et al. | |
| 5,530,514 A | 6/1996 | Lisson et al. | |
| 5,610,730 A | 3/1997 | Osipchuk | |
| 5,689,347 A | 11/1997 | Naoi | |
| 5,717,512 A | 2/1998 | Chmielewski, Jr. et al. | |
| 5,793,424 A | 8/1998 | Shepherd | |
| 5,811,828 A | 9/1998 | Laser | |
| 5,841,881 A | 11/1998 | Iwakawa et al. | |
| 5,909,302 A | 6/1999 | Guissin et al. | |
| 5,923,017 A | 7/1999 | Bjorner et al. | |
| 6,002,815 A | 12/1999 | Immega et al. | |
| 6,028,299 A | 2/2000 | Hirama et al. | |
| 6,064,423 A | 5/2000 | Geng | |
| 6,130,993 A | 10/2000 | Hayakawa | |
| 6,185,044 B1 | 2/2001 | Yoshikawa et al. | |
| 6,233,014 B1 | 5/2001 | Ochi et al. | |
| 6,335,758 B1 | 1/2002 | Ochi et al. | |
| 6,535,250 B1 | 3/2003 | Okisu et al. | |
| 6,619,551 B2 | 9/2003 | Okuwaki | |
| 6,621,063 B2 | 9/2003 | McQueen | |
| 6,741,284 B1 | 5/2004 | Shono | |
| 6,783,068 B2 | 8/2004 | Hecht | |
| 6,801,260 B1 | 10/2004 | Veksland et al. | |
| 6,963,074 B2 | 11/2005 | McQueen | |
| 6,966,494 B2 | 11/2005 | Nuebling | |
| 7,040,538 B2 | 5/2006 | Patel et al. | |
| 7,527,207 B2 | 5/2009 | Acosta et al. | |
| 7,623,226 B2 | 11/2009 | Legoupil | |
| 2002/0131139 A1 * | 9/2002 | Mandella et al. | 359/215 |

FOREIGN PATENT DOCUMENTS

| | | |
|---|---|---|
| EP | 0984319 | 3/2000 |
| JP | 11295051 | 10/1999 |
| WO | 9904550 A2 | 1/1999 |

OTHER PUBLICATIONS

Response to Examination Report filed Apr. 14, 2011, for corresponding European Application No. 06255861.4.

European Examination Report, dated Jul. 21, 2010, from corresponding EPO Application No. 06255861.4.

* cited by examiner

LARGE DEPTH OF FIELD LINE SCAN CAMERA

CLAIM OF PRIORITY

This application claims priority to U.S. patent application Ser. No. 11/559,669, filed Nov. 14, 2006, which claims priority to U.S. Provisional Patent Application No. 60/737,118, filed Nov. 16, 2005, the entire disclosure of which is incorporated by reference herein.

BACKGROUND

The present invention relates generally to optical scanning systems. More particularly, this invention relates to a scanning system having a large depth of field which is capable of focusing on and scanning a plurality of targets over a wide range of distances.

Various optical scanning systems have been developed for reading and decoding coded symbologies. Such optical scanning systems typically incorporate a light source and a light detecting means, such as a CMOS- or CCD-based image sensor. A portion of the light which is reflected from the coded symbology is detected by the image sensor and converted into an electrical signal, which is the basis for the digital image of the coded symbology that has been scanned. The digital image is then processed and decoded according to the specific type of coded symbology.

One disadvantage with prior known CMOS- and CCD-based scanning systems is that they require a mechanical focusing apparatus in order to focus the light reflected from the coded symbology onto the image sensor. Since a mechanical focusing apparatus typically operates slower than the image sensor and other electronics within the scanner, the focusing apparatus tends to be the limiting factor in the speed of operation of the scanning system. Additionally, focusing parts are subject to higher wear and maintenance requirements. Although there are scanning systems that are available which do not require a moveable focusing apparatus, these scanning systems typically have a very small depth of field.

U.S. Pat. No. 6,783,068 discloses a large depth of field camera which was developed by Accu-Sort Systems, Inc., the assignee of the present invention. This reference discloses an area array sensor used for scanning a large depth of field. An object height sensor is used to determine an object height so that the correct row of pixels is read. While the system described in U.S. Pat. No. 6,783,068 is effective for scanning a large depth of field, suitable area array sensors are currently available only at a very high cost. Further, such sensors typically transmit large quantities of information that can burden internal or external processing systems.

Accordingly, there exists a need for an efficient and inexpensive scanning system that can accurately read and decode coded symbologies over a large depth of field to focus light on an image sensor, and which can read symbologies on side-by-side objects of different heights.

SUMMARY OF THE INVENTION

The present invention recognizes and addresses the foregoing disadvantages, and others, of prior art constructions and methods. In one preferred embodiment, the present invention provides a system for imaging an object comprising a surface for receiving an object to be imaged and an imaging device. The imaging device comprising a housing, a fixed focusing optical device mounted to the housing and comprising a lens for focusing light reflected from the object on the surface, a plurality of independent linear imaging sensors are positioned in the housing at different distances from the fixed focusing lens so that a face of each of the plurality of independent linear imaging sensors is aligned parallel to the surface and a processor coupled to the plurality of independent linear imaging sensors for receiving an output signal from each of the plurality of independent linear imaging sensors representative of the reflected light. The lens defines a plane parallel to the surface, and the plurality of independent linear imaging sensors are adapted to receive reflected light from the object on the surface.

In some embodiments, the plurality of independent linear imaging sensors are located at different distances from the lens such that a plane intersecting each linear row of pixels for each of the plurality of independent linear imaging sensors intersects the lens plane at the Scheimpflug angle such that the focal point of each of the plurality of independent linear imaging sensors differ with respect to the surface. In other embodiments, a height measuring device detects a height of the object on the surface prior to reaching the imaging device, wherein the detected height is used by the processor for selectively reading the output signal from one of the plurality of independent linear imaging sensors. In yet other embodiments, the processor forms a two-dimensional image from the output signals of the plurality of independent linear imaging sensors. In still yet other embodiments, the processor is adapted to read an output signal from individual pixels located in a different one of the plurality of independent linear imaging sensors based on an intensity of the output of the individual pixels. In some or all of the above embodiments, the surface is moveable in a direction perpendicular to an axis of each of the plurality of independent linear imaging sensors.

In another preferred embodiment, a system for imaging an object comprises a surface for receiving an object to be imaged and an imaging device comprising a housing, a plurality of independent linear imaging sensors positioned in the housing so that a face of each of the plurality of independent linear imaging sensors is parallel to the surface, where the plurality of independent linear imaging sensors is adapted to receive reflected light from the object on the surface, a fixed focusing optical device mounted to the housing and comprising a single lens for focusing the reflected light from the object on the surface onto each of the plurality of independent linear imaging sensors, and a processor coupled to the plurality of independent linear imaging sensors for reading an output signal from each of the plurality of independent linear imaging sensors. The single lens may be an irregular lens that provides a plurality of focal lengths each corresponding to a respective one of the plurality of independent linear imaging sensors. The system may also comprise a plurality of linear actuators for independently moving each of the plurality of independent linear imaging sensors with respect to the fixed focusing optical device. In addition to the linear actuators, a height measuring device may be used for detecting a height of the object on the surface prior to reaching the imaging device, wherein the detected height is used by each of the plurality of linear actuators for moving each of the plurality of independent linear imaging sensors with respect to the fixed focusing device. A feedback loop from the processor to each of the plurality of linear actuators may be used to assist in positioning each of the plurality of independent linear imaging sensors.

In yet another preferred embodiment, a system for imaging an object comprising a surface for receiving an object to be imaged and an imaging device comprising. The imaging device comprises a housing, a fixed focusing optical device mounted to the housing and comprising a lens for focusing light reflected from the object on the surface, the fixed focusing optical device lens defining a plane parallel to the surface, a linear imaging sensor positioned in the housing radially outward from an axis normal to the lens plane, first and second mirrors rotatably coupled to a pivot axis and positioned so as to direct light entering the fixed focusing optical device onto the linear imaging sensor, and a processor coupled to the linear imaging sensor for selectively reading an output signal from individual pixels in the linear imaging sensor based on an intensity of the output signal from each of the individual pixels. Each of the first and the second mirrors are independently moveable about the pivot axis along a path generally perpendicular to the linear image sensor with respect to each other so that different portions of the surface can be focused onto different portions of the linear sensor. The system may also comprise a first and second actuator for respectively rotating the first and second mirrors about the pivot axis with respect to the linear imaging sensor. Additionally, the system may comprise third and fourth actuators for respectively translating the first and the second mirrors along the pivot axis with respect to the lineal imaging sensor. Moreover, a third mirror may be rotatably coupled to the pivot axis and positioned so as to direct light entering the fixed focusing optical device onto the linear imaging sensor. A height measuring device may be used to detect a height of the object on the surface, wherein the detected height information is used by the first and the second actuators for moving each of the first and second mirrors to focus on the object on the surface.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1A:
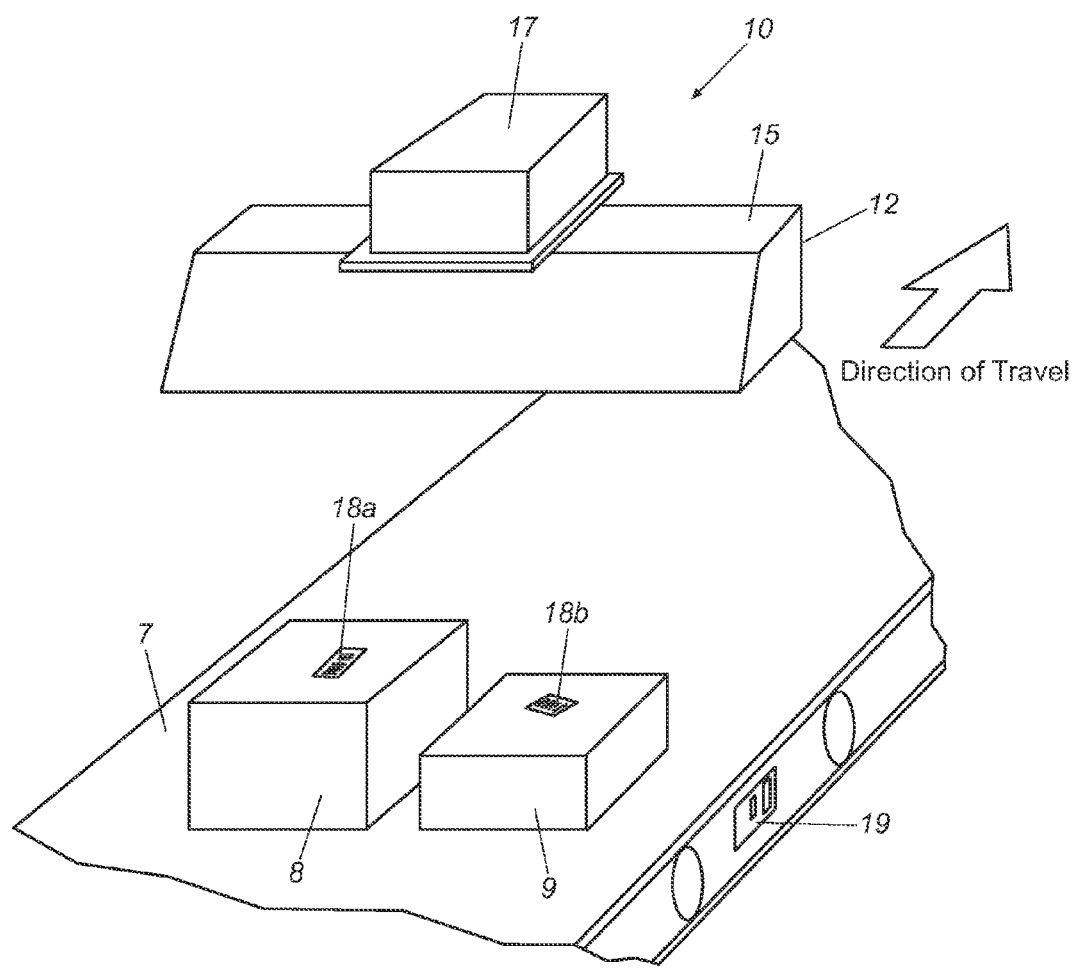
FIG. 1A is a top perspective view of a coded symbology scanning system in accordance with preferred embodiments of the present invention.

Repeat use of reference characters in the present specification and drawings is intended to represent same or analogous features or elements of the invention.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Additional aspects and advantages of the invention will be set forth in part in the description which follows and, in part, will be obvious from the description, or may be learned by practice of the invention.

Certain terminology is used in the following description for convenience only and is not considered limiting. Words such as "front", "back", "top" and "bottom" designate directions in the drawings to which reference is made. This terminology includes the words specifically noted above, derivatives thereof and words of similar import. Additionally, the terms "a" and "one" are defined as including one or more of the referenced item unless specifically noted. The phrase "at least one" followed by a list of two or more items (such as A, B, or C) means any individual one of A, B or C as well as any combination thereof.

Figure 1B:
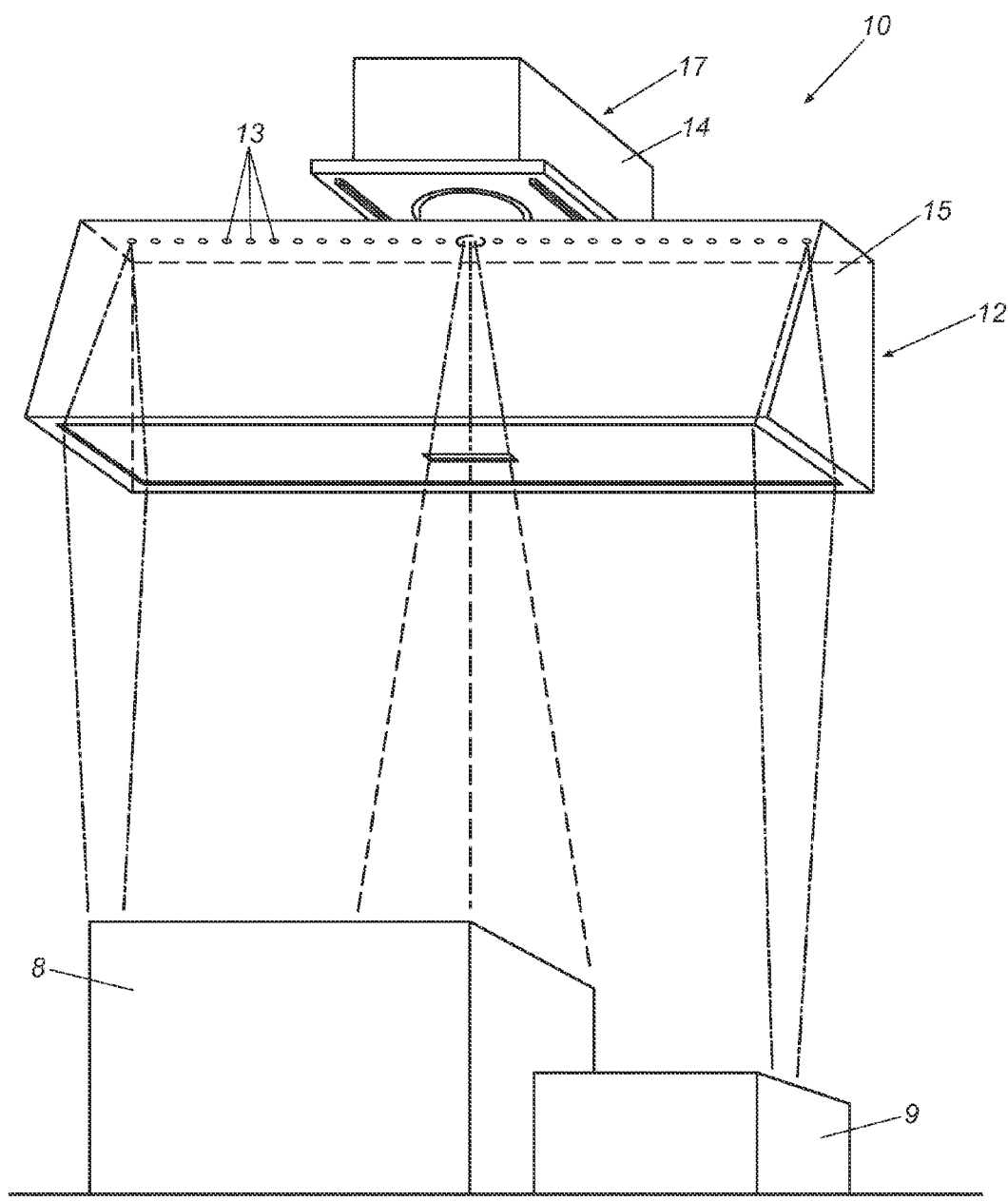
FIG. 1B is bottom perspective view of the coded symbology scanning system of FIG. 1A.
Figure 2:
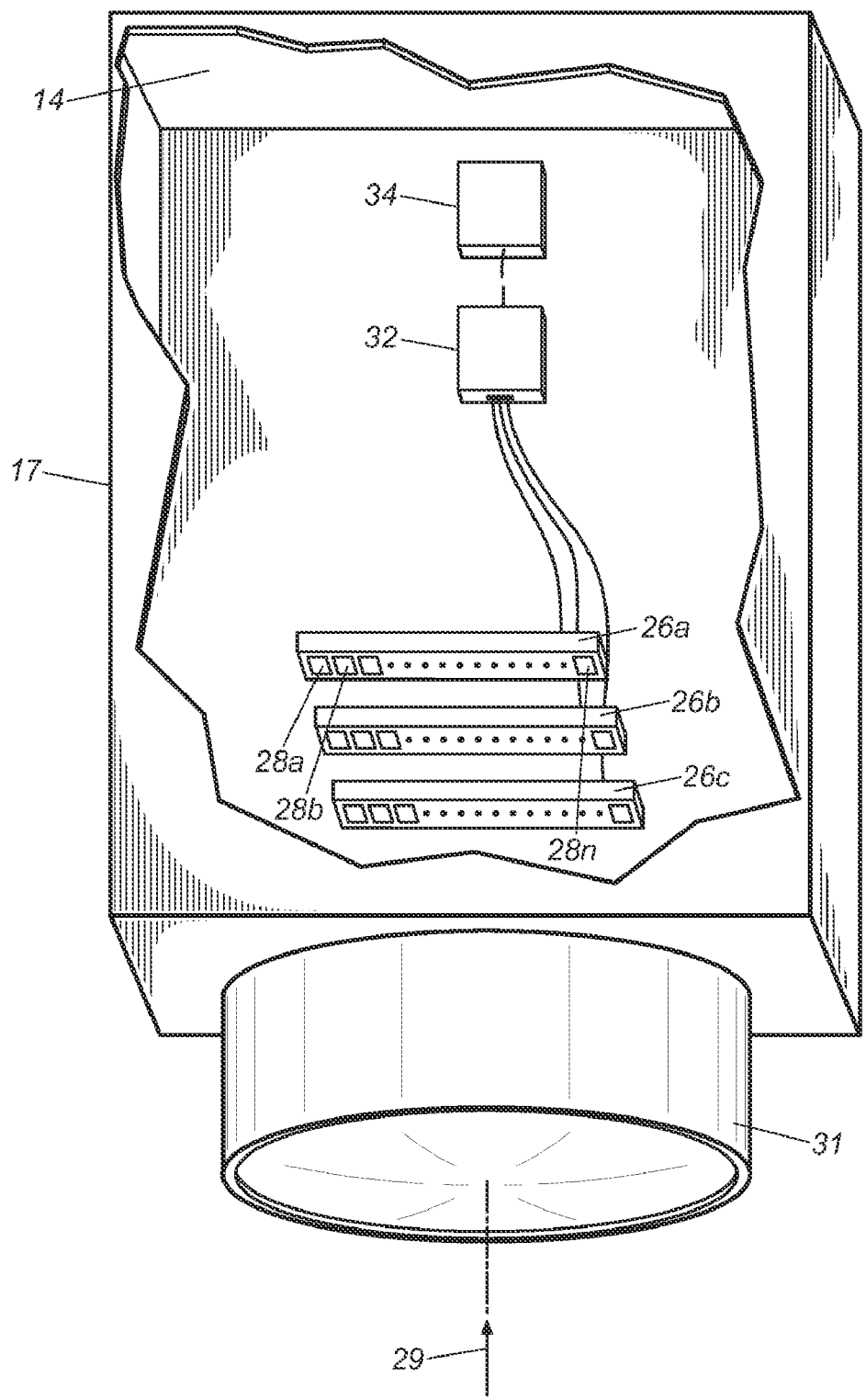
FIG. 2 is a camera according to a first preferred embodiment of the present invention for use in the scanning system of FIG. 1A.

Referring to FIGS. 1A and 1B, a scanning system 10 made in accordance with the present invention is shown. Scanning system 10 is able to scan any type of object. For simplicity, however, scanning system 10 will be explained with reference to scanning a coded symbology, and in particular a bar code symbol. Scanning system 10 includes a light source 12 and a camera 17 located within a housing 14. In a first preferred embodiment of the present invention, camera 17 includes a plurality of independent linear image sensors 26a-26c arranged side by side along a plane (FIG. 2). Alternatively, any suitable number of independent linear image sensors greater than 1 can be used. Those skilled in the art should know that any line scan image sensor may be utilized without departing from the spirit and scope of the present invention, for example either a CMOS or a CCD linear image sensor.

Light source 12 preferably includes a plurality of LEDs 13 mounted in a focusing container 15 for directing light emitted by LEDs 13. Light source 12 facilitates detection of subject bar code symbols 18a and 18b by illuminating bar code symbols 18a and 18b located on objects 8 and 9. Preferably, objects 8 and 9 are supported by a moving transport system 7. The scanning system 10 is aligned such that light reflected from bar code symbols 18a and 18b passes through a front of camera housing 14 to be detected by linear image sensors 26a-26c. As will be explained in detail hereinafter, linear image sensors 26a-26c are optically aligned parallel to the surface of the transport system 7 and perpendicular to the motion of transport system 7. It should be recognized by those skilled in the art that FIGS. 1A and 1B are illustrative only and are not drawn to scale.

A tachometer 19 monitors the speed of the surface of transport system 7 and objects 8 and 9 and provides this information to a processor 32 (shown in FIG. 2) to control the read-out rate of the plurality of linear image sensors 26a-26c. Those skilled in the art should know that there are several other methods of monitoring the speed of transport system 7 and objects 8 and 9 and providing this information to processor 32 to control the read-out rate of linear image sensors 26a-26c that may be used as well.

Referring to FIG. 2, in a first preferred embodiment of the present invention, camera 17 includes fixed focusing optics 31, a plurality of independent linear image sensors 26a-26c, a processor 32 and an output means 34. Linear image sensors 26a-26c include a column of pixels 28a-28n. In this embodiment, fixed focusing optics 31 includes at least one custom optic having more than one focal length, for example, an irregularly shaped lens. Preferably, the custom optic provides a unique focal length for each of linear image sensors 26a-26c such that objects of different heights positioned on the transport system 7, corresponding to different depths of field, are in focus (or nearly in focus) on different ones of linear image sensors 26a-26c. This configuration allows two or more adjacent or side-by side items having different heights, for example objects 8 and 9 positioned on transport system 7 in FIGS. 1A and 1B, to be viewed in focus (or nearly in focus) simultaneously by different ones of linear image sensors 26a-26c.

The focusing optics 31 focuses reflected light 29 onto the appropriate one of linear image sensors 26a-26c based on a depth of field to an object being scanned. Linear image sensors 26a-26c detect reflected light 29 and each pixel within each of linear image sensors 26a-26c converts the incident light energy into a stored electrical charge and ultimately into an electrical signal. The electrical signal comprises a value that represents the amount of light detected by a pixel. If the pixel's analog signal is digitized to have eight-bit resolution, the number of gray scale levels will be 256.

The resolution of the linear scan image is dependent on the number of pixels 28a-28n in each of linear image sensors 26a-26c. Linear image sensors 26a-26c are preferably aligned parallel to each other and transverse to the direction of travel of transport system 7. Each of the linear image sensors 26a-26c can be considered one row in a series of parallel lines when projected into the object plane.

Figure 3A:
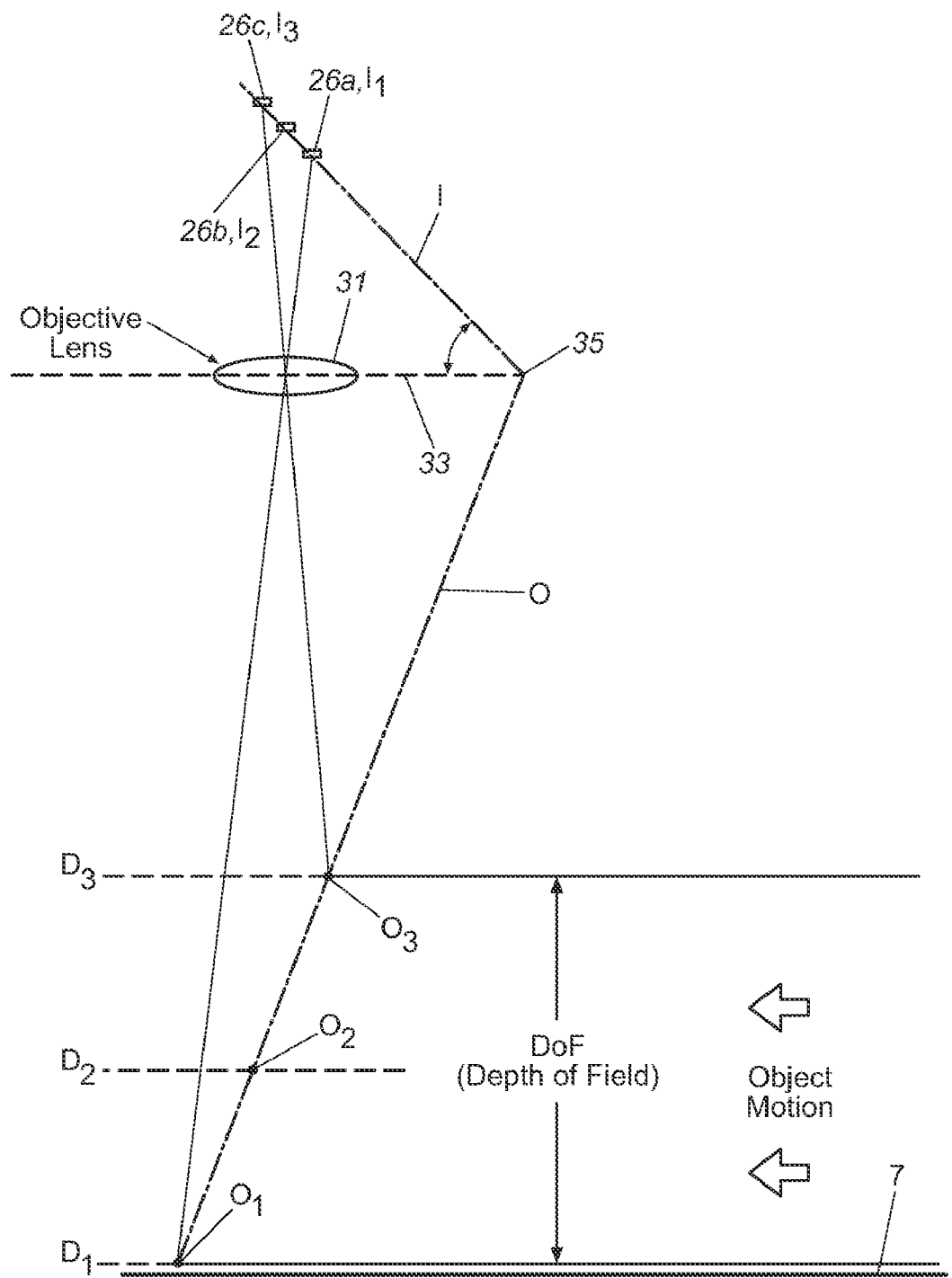
FIG. 3A illustrates a relationship between an object plane, an alternate camera with camera optics, and an image plane defined by a second preferred embodiment of the present invention for use in the scanning system of FIG. 1A.

According to a second preferred embodiment of the present invention, independent linear image sensors 26a-26c are preferably positioned at different distances from optics 31 so that an image plane I intersects each row of pixels in each of the linear image sensors, where the image plane is disposed at the Scheimpflug angle with respect to a median plane 33 of optics 31, as shown in FIG. 3A. Thus, each pixel in any specific column 28a-28n will have a corresponding unique focus point in an object plane O that also intersects with median plane 33 and image plane I along a line 35. The system 10 of the present invention utilizes the selective positioning of linear image sensors 26a-26c in order to read out information pertaining to the objects within the depth of field that are in focus or nearly in focus on each linear image sensor.

A processor 32 accesses the linear image sensors 26a-26c to obtain the desired information. The processor receives the data from all independent linear imaging sensors and may (1) process and store the output of one linear image sensor that is receiving data in focus or (2) process and store all data from each of the linear image sensors. The processor uses the processed data to form one or more 2-D images from the individual line scans detected by each linear image sensor. That is, if the data from one linear image scanner is selected, then a single 2-D image is formed from the plurality of line scans captured by the selected linear imager. If, on the other hand, two or more independent linear image sensors are selected, than an independent 2-D image is formed for each selected linear image sensor using that sensors respective data. A tachometer 19 can be used to determine a scan rate for sensors 26a-26c. This information is then output to output means 34 for further processing. Output means 34 may be a digital display, an image processing system, a positioning system, or any other type of system that will accept an output from an imaging camera.

Referring to FIG. 3A, linear image sensors 26a-26c are positioned at different distances from optics 31 so that image plane I intersects each row of pixels in each of the linear image sensors, where image plane I is disposed at an angle with respect to median plane 33 through optics 31. The angle, (hereinafter, the Scheimpflug angle), is determined using the Scheimpflug condition. The Scheimpflug angle is dependent on the focal length of optics 31 and a desired working range defining the depth of field (DoF) along object plane O. By positioning linear image sensors 26a-26c along the Scheimpflug angle, an object positioned within the depth of field (DoF) is imaged in focus, or close to in focus, onto the active portion of one of the linear image sensors 26a-26c.

Figure 3B:
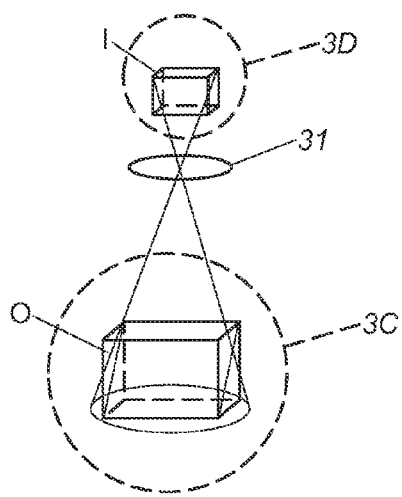
FIG. 3B illustrates a 3-D spatial relationship between the object plane, camera optics, and image plane of FIG. 3A.
Figure 3D:
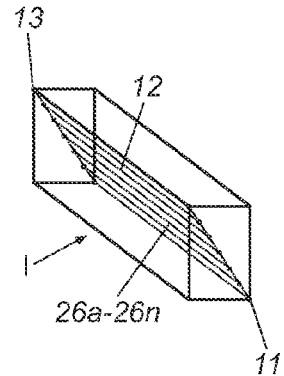
FIG. 3D shows the image plane of FIG. 3B in greater detail.
Figure 3C:
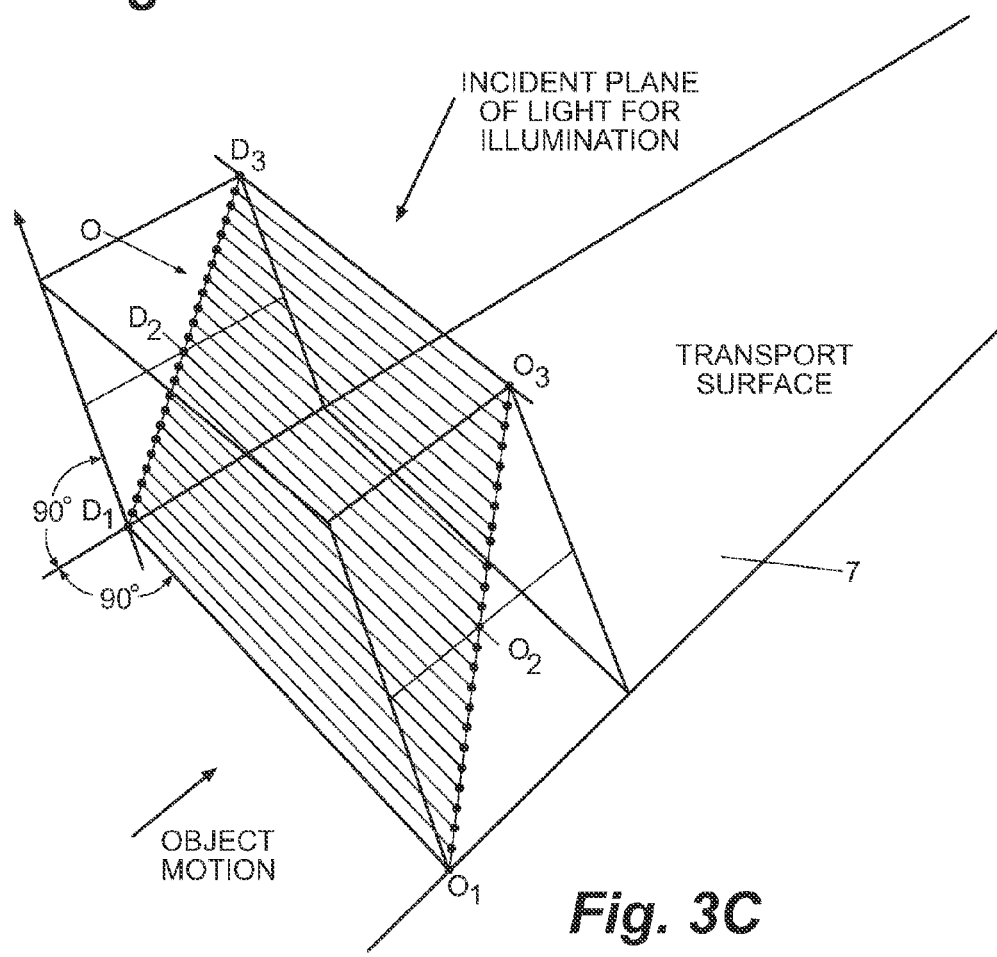
FIG. 3C shows the object plane of FIG. 3B in greater detail.

Focusing is improved for a wider array of objects of differing heights over a given depth of field (DoF) by increasing the number of linear image sensors and decreasing spacing between adjacent linear imaging sensors. Each horizontal line in object plane O has a corresponding horizontal line in image plane I that is in focus. For example, each of linear image sensors 26a-26c in image plane I corresponds to a specific distance in object plane O; and each such distance in object plane O corresponds to a line parallel to a surface of transport system 7 and perpendicular to the direction of motion of transport system 7. Referring to FIG. 3B, the spatial relationship between object plane O, optics 31 and image plane I is shown. FIG. 3C shows object plane O of FIG. 3B in greater detail, and FIG. 3D shows image plane I of FIG. 3B in greater detail.

As shown in FIGS. 3A-3D, an object O1 in object plane O at a distance D1 from optics 31 will be in focus or close to in focus in image plane I on linear image sensor 26a on its string of pixels I1. Likewise, an object 02 in object plane O at distance D2 will be in focus or close to in focus in image plane I on linear image sensor 26b at its string of pixels I2, and an object O3 in object plane O at distance D3 will be in focus or close to in focus in image plane I on the linear image sensor 26c at its string of pixels I3. Accordingly, for any plane parallel to the surface of the transport system 7 in object plane O within the depth of field (DoF), a corresponding one of linear image sensors 26a-26c will be in focus or close to in focus. Therefore, linear image sensors 26a-26c having an object plane focal point distance, for example one of distances D1, D2, D3 that best corresponds to an object height, for example a height represented by objects O1, O2, O3, will be in optimal focus.

Depending on the quality of illumination and the distance between linear image sensors 26a-26c, each of the sensors 26a-26c will receive some light regardless of the height of object O1, O2, O3. However, the linear image sensor in optimal focus will receive the most light. Preferably, processor 32 selects the data received from one of sensor 26a-26c that receives the most light, indicating optimal focus, to be processed and stored. Through comparing the intensity of the signals read by each linear image sensors 26a-26c, the appropriate in focus linear image sensor 26 can be read and the data further processed. The data from linear image sensor 26 that is selected by processor 32 is sent to output means 34 for further processing, decoding, storage and/or display as is well known by those skilled in the art. Data is periodically read out of linear image sensors 26a-26c as will be described in greater detail hereinafter in order to read coded symbology on objects carried past the scanner.

Figure 4A:
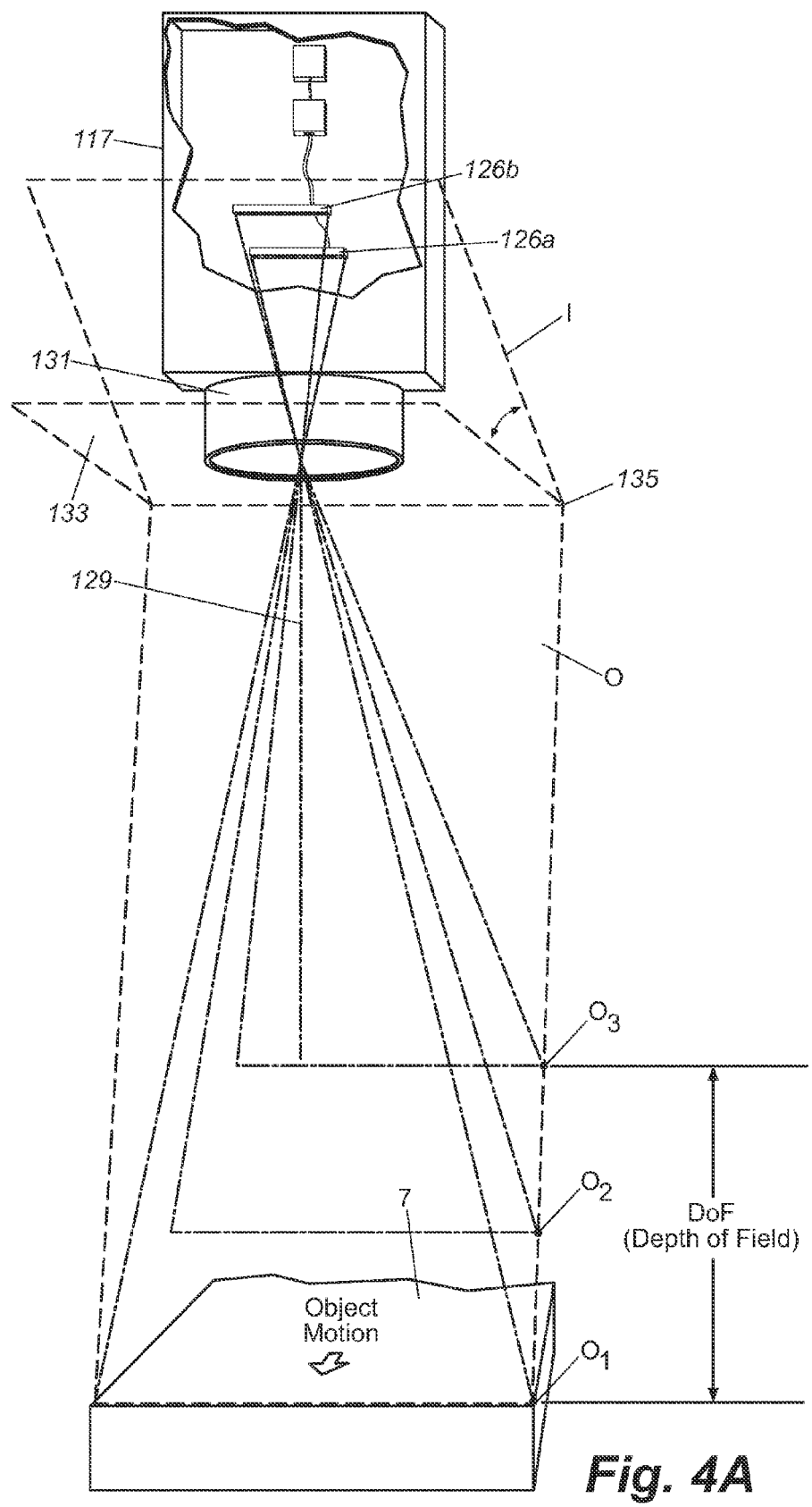
FIGS. 4A and 4B illustrate a 3-D spatial relationship between an object plane, camera optics, and an image plane defined by a third preferred embodiment of the present invention.
Figure 4B:
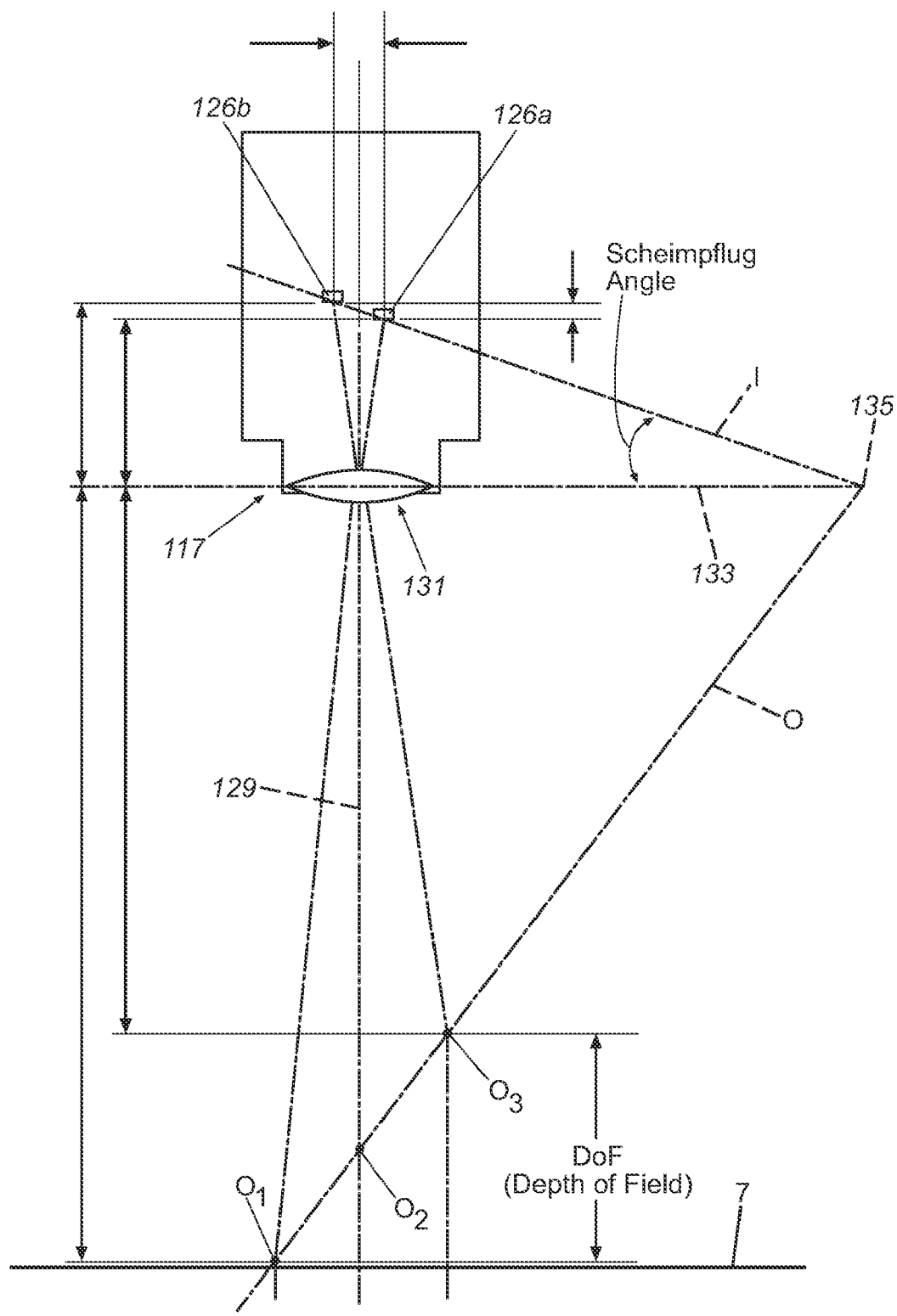

Referring to FIGS. 4A and 4B, a third preferred embodiment of the present invention is shown in which a system 110 includes a compact camera 117 having only two linear image sensors 126a and 126b and optics 131. Linear image sensors 126a and 126b are positioned at different distances from optics 131 so that a common image plane I intersects each row of pixels in each of the linear image sensors, where image plane I is disposed at an angle with respect to a median plane 133 through optics 131 at the Scheimpflug angle. As discussed above with reference to the first and second embodiments, an object plane O intersects with image plane I and median plane 133 along line 135 so that each horizontal line in an object plane O has a corresponding horizontal line in image plane I that is in focus. Thus, sensor 126b is generally in focus between O1 and O2 and sensor 126a is generally in focus between O2 and O3, thereby increasing the overall depth of field of camera 117. Preferably, system 110 includes a conveyor for transporting objects where symbology to be read is within the depth of field (DoF) of the camera. In this embodiment, linear image sensors 126a and 126b have a lower scan rate than the linear image sensors described in the other embodiments. As a result, each line scan image is processed separately by the processor and a 2-D image is not created from the captured data.

The first, second and third embodiments of the invention allow two or more singulated or non-singulated objects having substantially different heights positioned on transport system 7 in FIG. 1, for example objects 8 and 9, to be viewed in focus (or nearly in focus) by different linear image sensors 26a-26c or 126a-126b without a mechanical focusing or height detection device. Accordingly, information received simultaneously from adjacent objects can be processed simultaneously by the system recognizing and reading in focus data from more than one linear image sensor.

Figure 5:
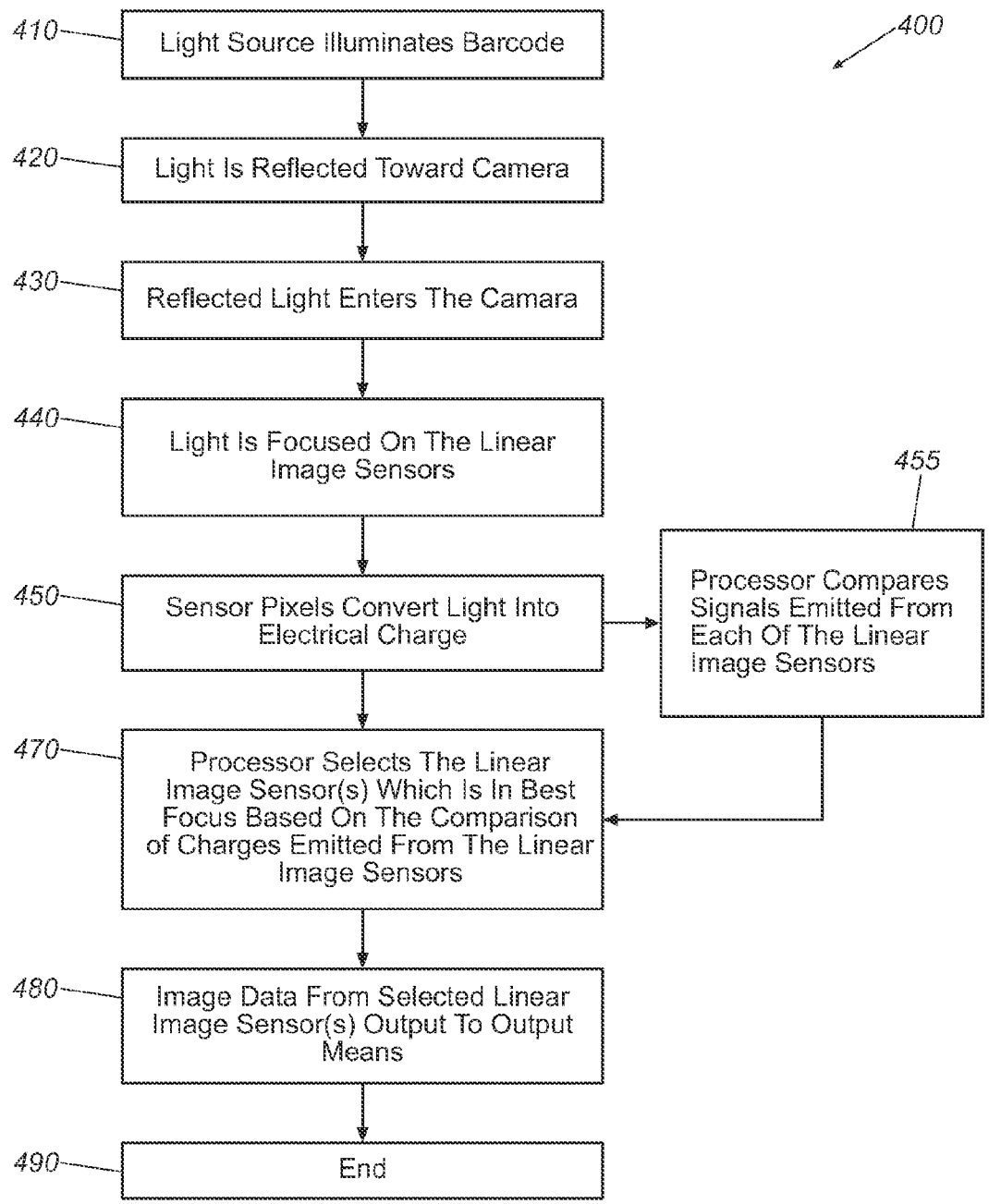
FIG. 5 is a flow diagram of a preferred symbol reading and decoding method.

In operation, scanning systems 10 and 110 according to the first, second or third preferred embodiments of the present invention execute the bar code symbol reading and decoding procedure 400 shown in FIG. 5. A light source 12 illuminates a subject bar code symbol 18 (step 410). Light is reflected from bar code symbol 18 toward camera 17 or 117 (step 420). The reflected light enters camera 17 or 117 via focusing optics 31 or 131 (step 430). Focusing optics 31 or 131 focus light 29 onto linear image sensors 26a-26c or 126a-126b (step 440). Each pixel within each of linear image sensors 26a-26c or 126a-126b converts the light into a charge which is converted into an electrical signal (step 450) that is transmitted to processor 32. Processor 32 compares the signals transmitted from each of the plurality of linear image sensors 26a-26c or 126a-126b (step 455). Stronger signals, for example, represent a larger quantity of light received by a pixel, which indicates better focusing at the particular pixel location. Processor 32 preferably selects one or more linear image sensors 26a-26c or 126a-126b, which are in relatively good focus compared with other ones of the plurality of linear image sensors 26a-26c or 126a-126b, based on a comparison of the signal outputs of the pixels of the linear image sensors (step 470). Alternatively, only certain in-focus pixels from one or more of linear image sensors 26a-26c or 126a-126b can be selected. Also alternatively, a height detection device, for example, an overhead laser triangulation device or a light curtain, can be used for providing processor 32 with object height information to be used in selecting one or more sensors 26a-26c or 126a-126b that are in focus.

The information from the selected linear image sensor(s) 26a-26c or 126a-126b, or from only selected pixels within selected sensors 26a-26c or 126a-126b, is read out at a periodic rate. This periodic rate can be determined by processor 32 using speed information of objects 8 and 9 (preferably determined by tachometer 19 as shown in the embodiment of FIGS. 1A and 1B), and the desired sample density. The image data is forwarded to output means 34 for decoding, storage and/or display (step 480) using methods that are well known to those of skill in the art.

The periodic rate at which information is read out from the selected sensors can alternatively be set at a fixed value without utilizing speed information of the objects and without using a tachometer. Referring to the third embodiment shown in FIGS. 4A and 4B, camera 117 of scanning system 110 is configured to scan at a fixed rate for barcodes within its depth of field (DoF) on packages passing at any suitable speed. The image data is forwarded to an output device for decoding, storage and/or display (See step 480, FIG. 5). This type of scanning system allows easy compatibility with many preexisting package conveying systems and is suitable for lower cost applications.

Figure 6:
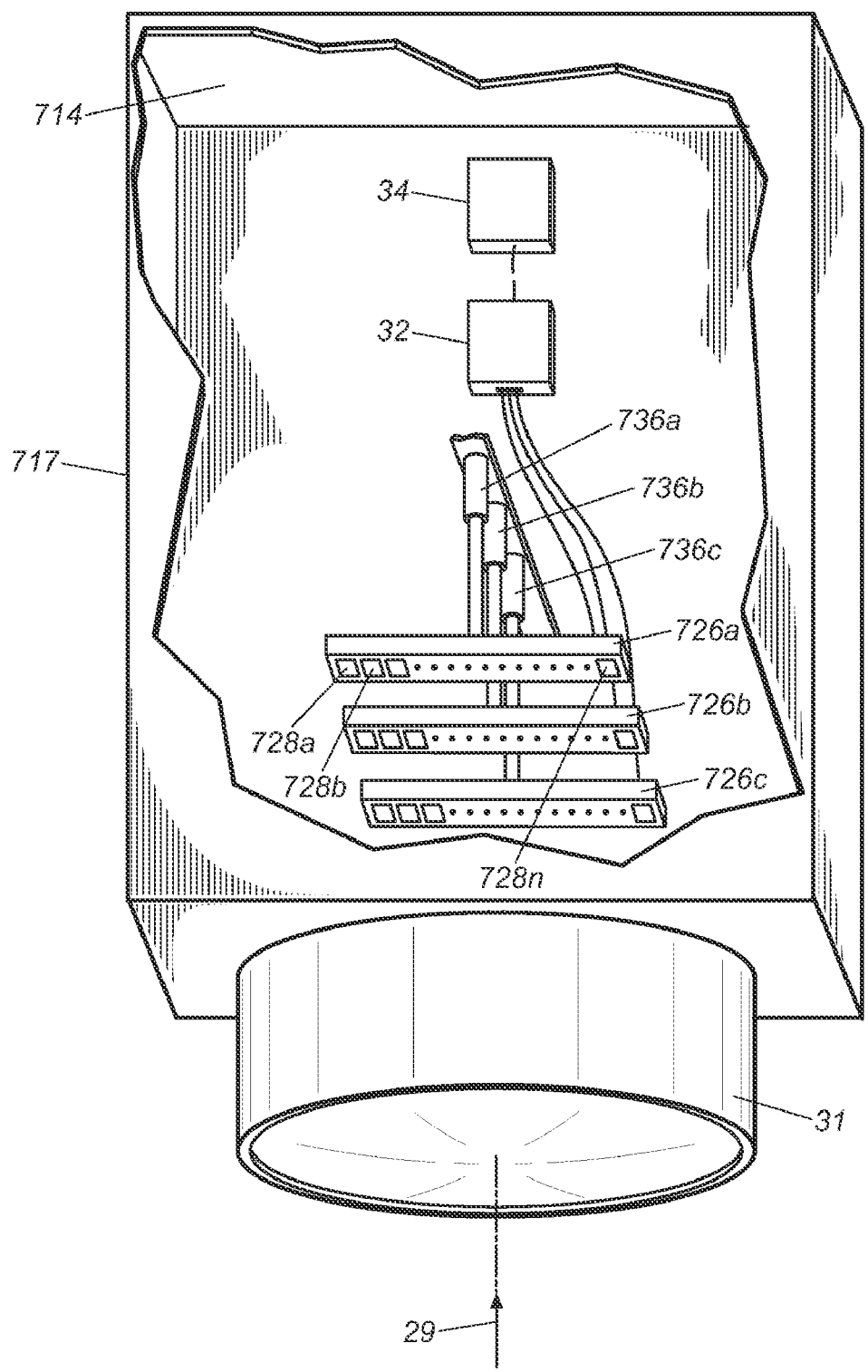
FIG. 6 is another alternate camera according to a fourth preferred embodiment of the present invention for use in the scanning system of FIG. 1A.
Figure 7:
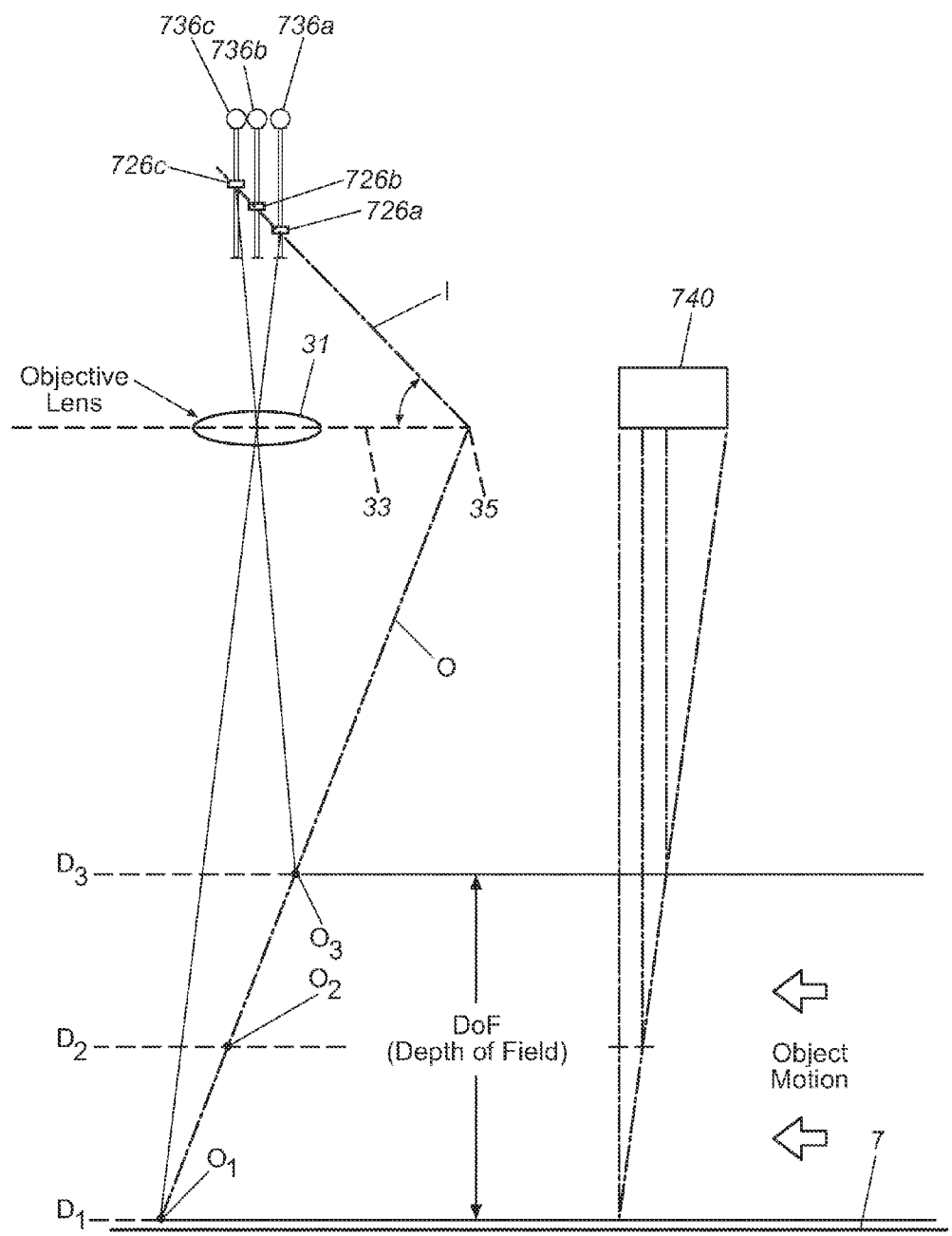
FIG. 7 illustrates a relationship between an object plane, camera optics and an image plane defined by an embodiment of the scanning system of FIG. 1A including the alternate camera of FIG. 6.

Referring to FIGS. 6 and 7, in a fourth preferred embodiment of the present invention, an alternative camera 717 replaces camera 17 in the system 10 for scanning an object. Camera 717 is configured in a manner similar to camera 17 of FIG. 2, but utilizes actuators 736a-736c, preferably servo motors, to translate linear image sensors 726a-726c in a direction toward or away from lens 31. In this embodiment, a custom optic is not required, but may be provided if suitable for a particular application. Sensors 726a-726c preferably travel along a path perpendicular to lens 31. In this manner, each sensor 726a-726c can be individually focused to more precisely sense light reflected from objects on transport system 7. The ability to move sensors 726a-726c not only allows greater precision in focusing, but also increases the effective range of depth of field of system 10. While three sensors 726a-726c with corresponding respective actuators 736a-736c are shown, any suitable number of sensors can be used. It should be clear to those skilled in the art that for each additional linear image sensor and associated actuator provided, an additional adjacent object of unique height can be simultaneously scanned. For example, a system with two linear image sensors can simultaneously scan two side-by-side objects of different heights, and a system with three linear image sensors can simultaneously scan three side-by-side objects of different heights. A height detection device, for example, an overhead laser triangulation device 740 or alternatively a light curtain can be used for providing processor 32 with object height information for selecting and focusing sensors 726a-726c.

Figure 8:
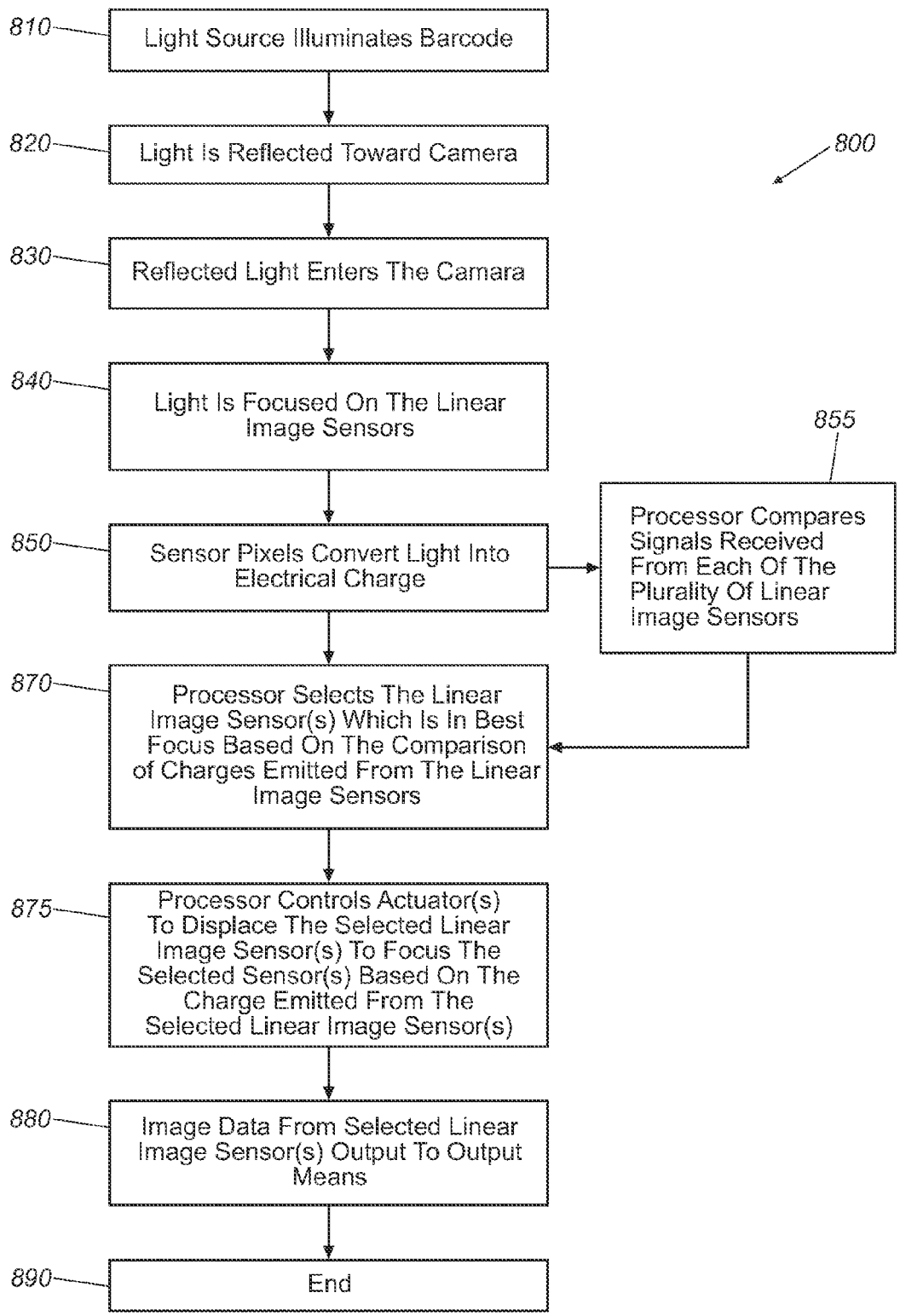
FIG. 8 is a flow diagram of another alternative preferred symbol reading and decoding method.

Scanning system 10 utilizing camera 717 in place of camera 17 executes an alternative bar code symbol reading and decoding procedure 800 shown in FIG. 8. A light source 12 illuminates a subject bar code symbol 18 (step 810). Light is reflected from bar code symbol 18 toward camera 717 (step 820). The reflected light enters camera 717 via focusing optics 31 (step 830). Focusing optics 31 focuses light 29 onto linear image sensors 726a-726c (step 840). Each pixel on each of linear image sensors 726a-726c converts the light into a charge that is converted into an electrical signal (step 850).

Processor 32 compares the signals transmitted from each of linear image sensors 726a-726c (step 855). Stronger signals, for example, represent a larger quantity of light received by a pixel, which indicates better focusing at the particular pixel row. Processor 32 preferably selects one or more linear image sensors 726a-726c that are in relatively good focus compared with other ones of the plurality of linear image sensors 726a-726c based on a comparison of the signal outputs of the pixels of the linear image sensors (step 870). Alternatively, only certain in-focus pixels from one or more of the linear image sensors 726a-726c can be selected, or all of the linear image sensors may be selected, read and stored for further processing.

Processor 32 controls one or more of actuators 736a-736c to translate the respective selected one or more linear image sensors 726a-726c (step 875) based on charge emitted from selected linear image sensor(s) 726a-726c. Preferably, during actuation, actuators 736a-736c receive feedback at discrete time intervals from processor 32 to enable actuators 736a-736c to position selected linear image sensor(s) 726a-726c in a best focus position. Alternatively, in addition to or instead of receiving signals from linear image sensors 726a-726c, the processor can receive signals from height detection devices, for example the light curtain or overhead laser triangulation device 740, in order to select and position appropriate linear image sensor(s) 726a-726c.

The information from selected linear image sensor(s) 726a-726c, from all linear image sensors or from only selected pixels within selected sensors 726a-726c is read out at a periodic rate. This periodic rate is determined by processor 32 preferably using speed information of objects 8 and 9, (determined by the tachometer 19), and the desired sample density. The image data is forwarded to output means 34 for decoding, storage and/or display (step 880) using methods that are well known to those of skill in the art.

Figure 9A:
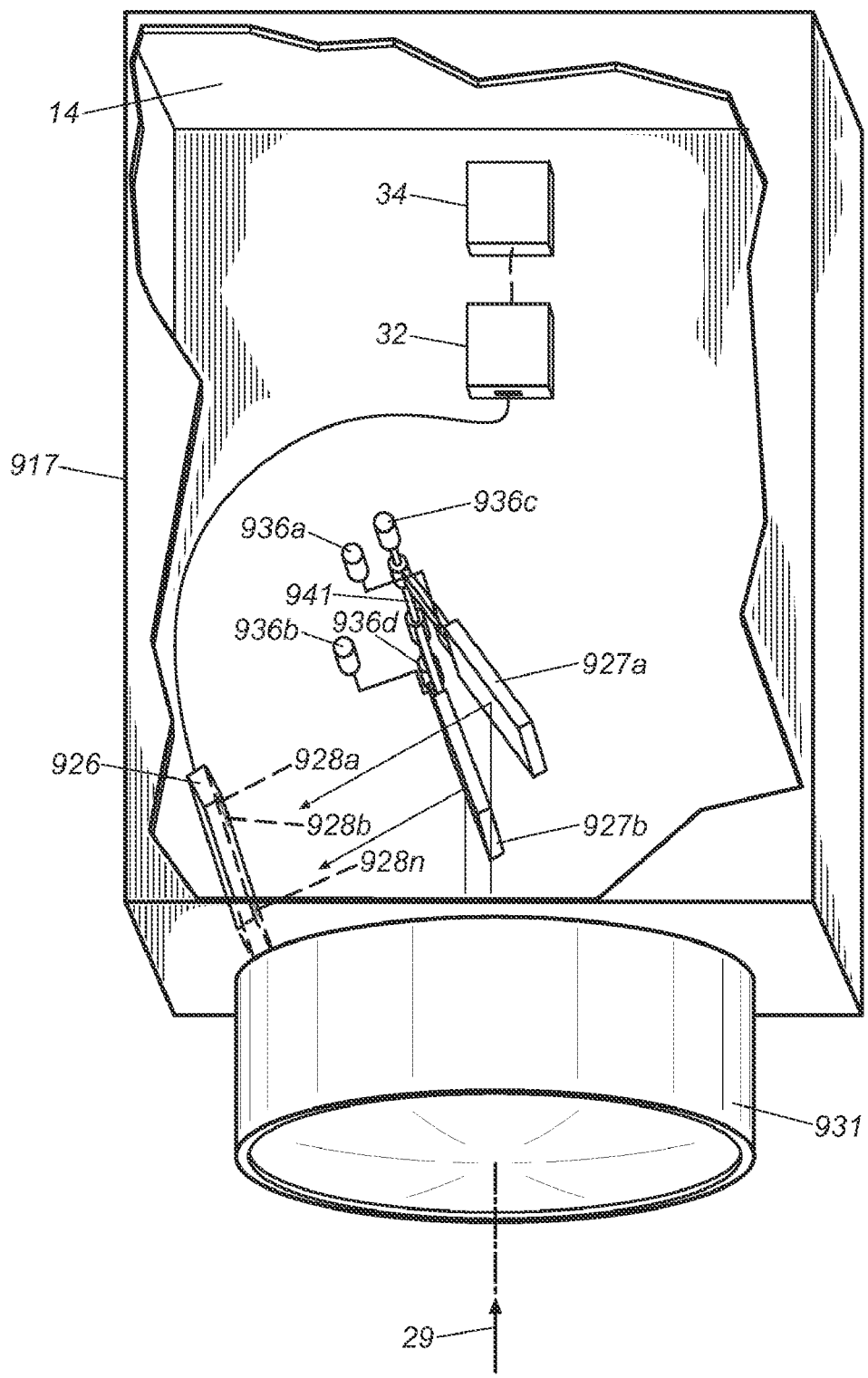
FIG. 9A is a camera according to a fifth preferred embodiment of the present invention for use in the scanning system of FIG. 9B.
Figure 9B:
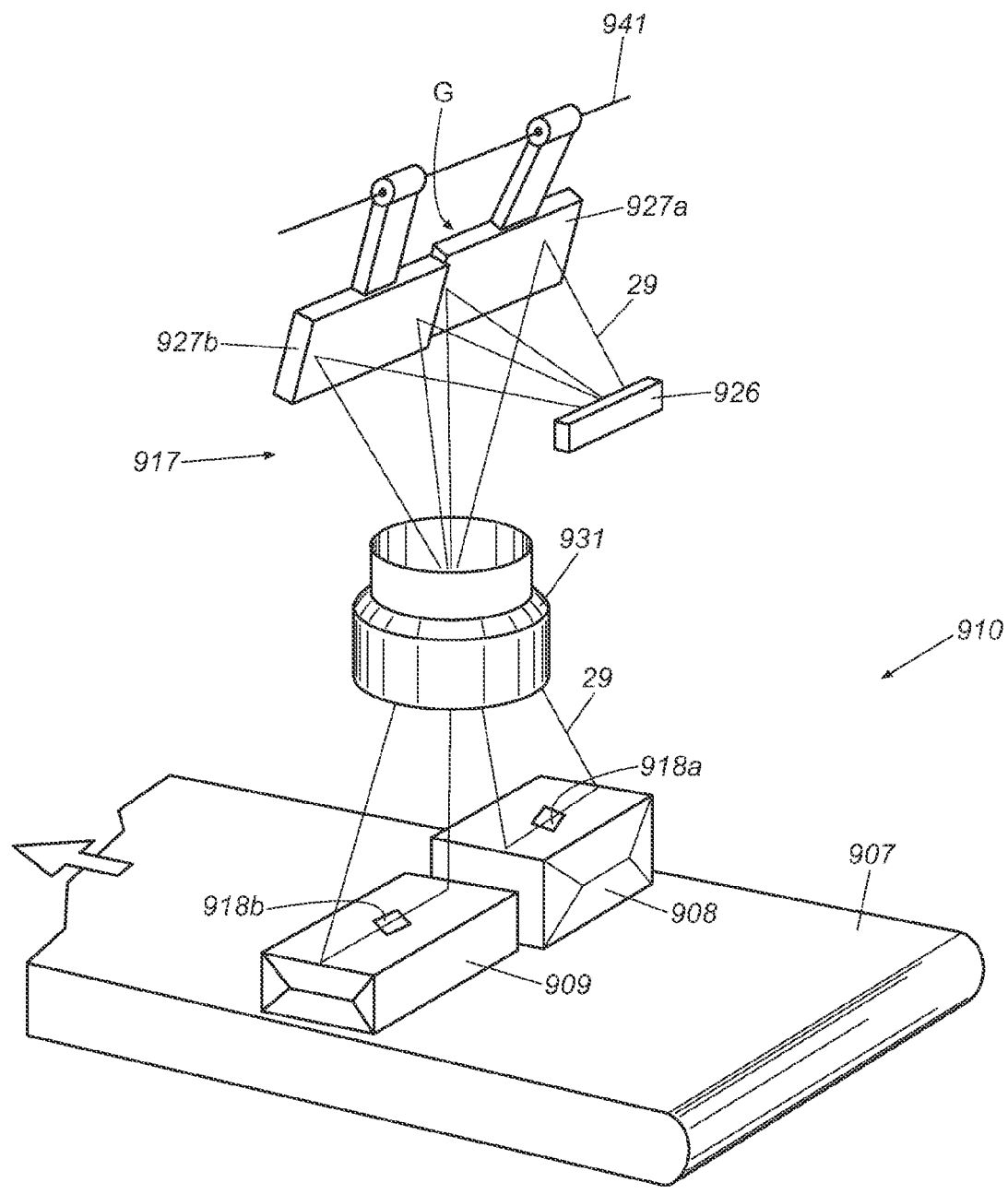
FIG. 9B is a top perspective view of a coded symbology scanning system in accordance with the fifth preferred embodiment of the present invention.

Referring to a fifth embodiment of the invention as shown in FIGS. 9A and 9B, a system 910 has a camera 917 preferably having a single linear image sensor 926 and first and second adjustable adjacent mirrors 927a and 927b, which reflect light received through optics 931 onto linear image sensor 926. Optics 931 preferably includes a single lens, but alternatively, the optics can have multiple lenses in any suitable configuration. System 910 transports objects, for example objects 908 and 909, on a transport system 907 in a manner similar to that provided in the first embodiment shown in FIGS. 1A and 1B.

Camera 917 utilizes first, second, third and fourth actuators 936a-d, which are preferably voice coil actuators, or alternatively servo motors, to adjust adjustable mirrors 927a and 927b. First and second actuators 936a and 936b pivot mirrors 927a and 927b about an axis 941 in a direction toward or away from linear image sensor 926. In this embodiment, a custom optic is not required, but may be provided if suitable for a particular application. During pivoting, mirrors 927a and 927b preferably travel along a path generally perpendicular to linear image sensor 926. In this manner, a first portion of linear image sensor 926 receives reflected light from first adjustable mirror 927a and a second portion of linear image sensor 926 receives reflected light from second adjustable mirror 927b. Accordingly, two separate portions of linear image sensor 926, corresponding to two separate portions of the conveyor, can be individually focused to more precisely sense light reflected from objects, for example the objects 908 and 909 on transport system 907, as shown in FIG. 9B.

The ability to move mirrors 927a and 927b not only allows greater precision in focusing, but also increases the effective range of the depth of field of system 910. Preferably, third and fourth actuators 936c and 936d are provided to translate mirrors 927a and 927b along axis 941. In this manner, if an object with a barcode or other coded symbology is positioned in a location such that there is a potential for the object to be located in a gap G between mirrors 927a and 927b, the mirrors can be translated axially so that the entire object image is reflected by one mirror onto linear image sensor 926 so that any coded symbology can be read without gap G disrupting it. Alternatively, a single actuator can replace third and fourth actuators 936c and 936d to translate both of mirrors 927a and 927b together.

While two mirrors 927a and 927b, with corresponding respective actuators 936a-d, are shown, any suitable number of mirrors can be used. It should be clear to those skilled in the art that for each additional mirror and associated actuator provided, it would be possible to simultaneously scan an additional adjacent object, which can have a unique height. For example, a system with two mirrors can simultaneously scan two side-by-side objects of different heights, and a system with three mirrors can simultaneously scan three side-by-side objects of the same or different heights. A height detection device, for example, overhead laser triangulation device 740 as shown in FIG. 7, can be used to provide processor 32 with object height information for each of the objects for adjusting mirrors 927a and 927b.

Figure 10:
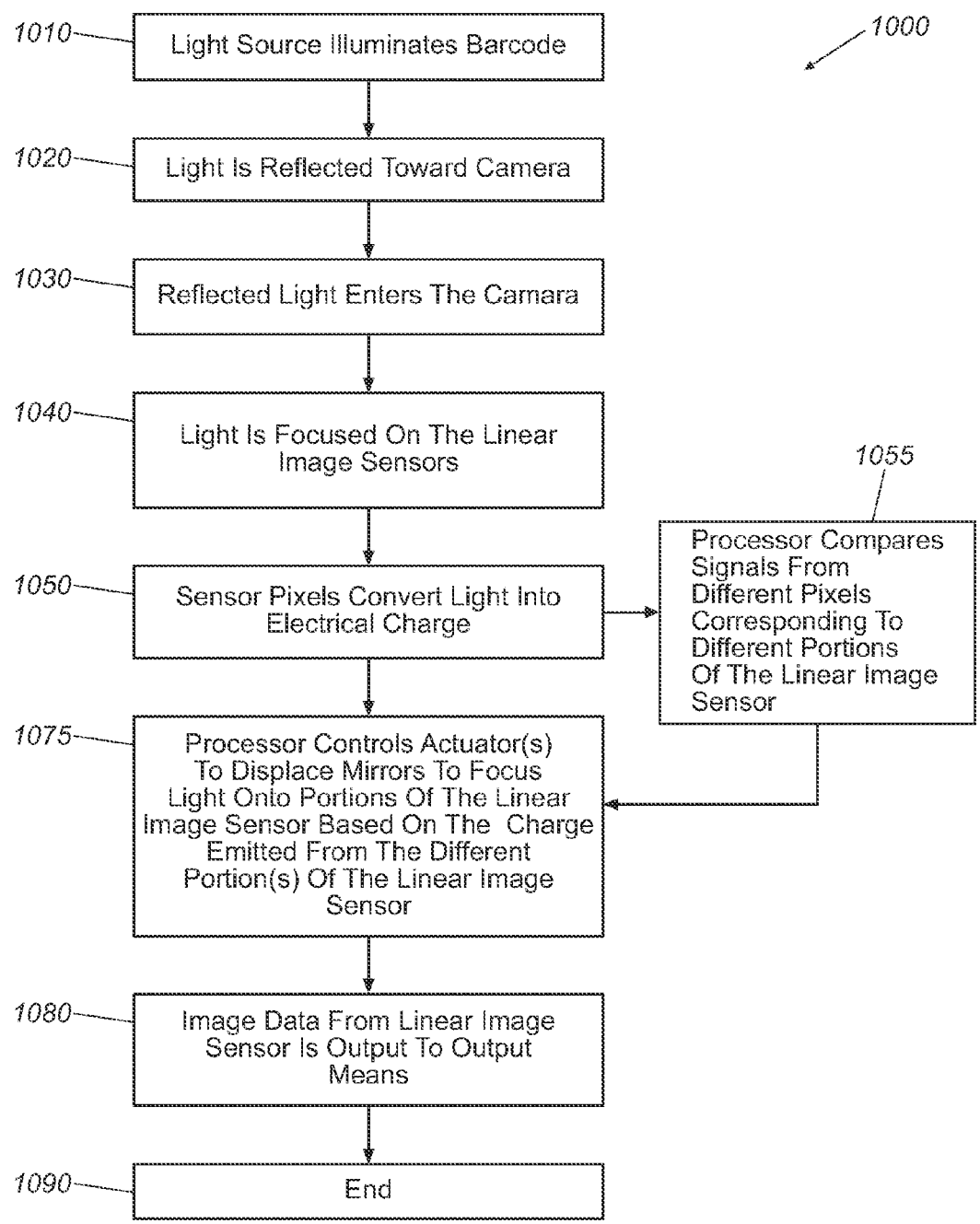
FIG. 10 is a flow diagram of another alternative preferred symbol reading and decoding method.

Scanning system 910 utilizing camera 917 executes an alternative bar code symbol reading and decoding procedure 1000 shown in FIG. 10. A light source illuminates subject bar code symbols 918a and 918b (step 1010). Light is reflected from bar code symbols 918a and 918h toward camera 917 (step 1020). The reflected light enters camera 917 via focusing optics 931 (step 1030), which focus light 29 onto mirrors 927a and 927b thereby directing light 29 onto linear image sensor 926 (step 1040). Each pixel on linear image sensor 926 converts the light into a charge which is converted into an electrical signal (step 1050). Processor 32 compares the signals transmitted from different portions of linear image sensor 926 (step 1055). Stronger signals, for example, represent a larger quantity of light received by particular pixels 928-928n indicating better focusing at a particular portion of the linear image sensor.

Processor 32 controls one or more of actuators 936a-d to displace one or more of mirrors 927a and 927b (step 1075) based on charge emitted from the different portions of linear image sensor 926. Preferably, during actuation, actuators 936a-d receive feedback at discrete time intervals from processor 32 to enable actuators 936a-d to position mirrors 927a and 927b in a best focus position. Alternatively, in addition to or instead of receiving signals from the different portions of linear image sensor 926, the processor can receive signals from height detection devices, for example a light curtain or overhead laser triangulation device 740 shown in FIG. 7, in order to select and position one or both of mirrors 927a and 927b.

The information from linear image sensor 926 or from only selected pixels within linear image sensor 926 is read out at a periodic rate. This periodic rate can be set or optionally can be determined by processor 32, preferably using speed information for objects 908 and 909, and the desired sample density. The image data is forwarded to output means 34 for decoding, storage and/or display (step 1080) using methods that are well known to those of skill in the art.

As disclosed above, the present invention has the ability to accurately image multiple side-by-side cartons of varying height being transported on a conveyor system.

While specific embodiments of the present invention have been shown and described, many modifications and variations could be made by one skilled in the art without departing from the spirit and scope of the invention. For example, although a stationary scanner has been utilized in the above embodiments, the embodiments and principles described herein may also be applied to mobile or hand-held scanners. The above description serves to illustrate and not limit the particular form in any way.

What is claimed is:

1. A system for imaging an object comprising:
   a. a surface for receiving an object to be imaged;
   b. an image device comprising:
      i. a housing;
      ii. a lens mounted in said housing for focusing light reflected from an object on said surface;
      iii. a linear image sensor positioned in said housing radially outward from an axis normal to said surface and passing through said lens;
      iv. a plurality of mirrors, each mirror rotatably coupled to a pivot axis and positioned so as to direct light passing through said lens from an object onto said linear image sensor; and
   c. a processor coupled to said linear image sensor for reading an output signal from individual pixels in said linear image sensor based on an intensity of said output signal from each of said individual pixels,
   wherein each said mirror is independently moveable about its said pivot axis with respect to said linear image sensor along a path generally perpendicular to said linear image sensor so that objects of different heights on said surface can be focused onto respective different portions of said linear image sensor.

2. The system for imaging an object of claim 1, further comprising at least one actuator for respectively rotating at least one of said plurality of mirrors about its said pivot axis.

3. The system for imaging an object of claim 1, wherein at least one of said plurality of mirrors translate along its said pivot axis.

4. The system for imaging an object of claim 3, further comprising at least one actuator for translating said at least one of said plurality of mirrors along its said pivot axis so that heights focused by said at least one mirror onto said linear image sensor is variable.

5. The system for imaging an object of claim 4, further comprising at least another actuator for translating another one of said plurality of mirrors along its said pivot axis.

6. The system for imaging an object of claim 1, further comprising a first, a second, and a third said mirror, each rotatably coupled to its said pivot axis and positioned so as to direct light passing through said lens onto said linear image sensor.

7. The system for imaging an object of claim 1, further comprising a height sensor for detecting a height of an object on said surface, wherein detected height information is used by respective actuators for moving each of said plurality of mirrors to focus on an object on said surface.

8. A system for imaging an object comprising:
   a. a surface for receiving an object to be imaged;
   b. an imaging device comprising:
      i. a housing;
      ii. a lens mounted to said housing for focusing light reflected from an object on said surface;
      iii. a linear image sensor positioned in said housing;
      iv. first and second mirrors, each rotatably coupled to a pivot axis and positioned so as to direct light passing through said lens from an object onto said linear image sensor; and
   c. a processor coupled to said linear image sensor for reading an output signal from said linear image sensor,
   wherein each of said first and said second mirrors are independently moveable about its said pivot axis along a path generally perpendicular to said linear image sensor.

9. The system for imaging an object of claim 8, wherein each of said first and said second mirrors move axially along its said pivot axis.

10. The system for imaging an object of claim 8, further comprising first and second actuators for respectively rotating said first and second mirrors about its said pivot axis.

11. The system for imaging an object of claim 10, further comprising third and fourth actuators for respectively translating said first and said second mirrors along its said pivot axis.

12. The system for imaging an object of claim 8, further comprising a third mirror rotatably coupled to a said pivot axis and positioned so as to direct light passing through said lens onto said linear image sensor.

13. The system for imaging an object of claim 10, further comprising a height sensor for detecting a height of an object on said surface, wherein detected height information is used by said first and said second actuators for moving each of said first and second mirrors to focus on an object on said surface.

14. A system for imaging an object comprising:
   a. a surface for receiving an object to be imaged;
   b. an imaging device comprising:
      i. a housing;
      ii. a lens mounted to said housing for focusing light reflected from an object on said surface, said lens defining a plane parallel to said surface;
      iii. a linear imaging sensor positioned in said housing at a first distance away from said lens in a direction perpendicular to the plane;
      iv. a mirror having first and second portions rotatably coupled to a pivot axis and positioned so as to direct light passing through said lens onto said linear imaging sensor; and
   c. a processor coupled to said linear imaging sensor for reading an output signal from said linear imaging sensor,
   wherein said pivot axis is located at a second distance away from the lens, in the direction perpendicular to the plane, that is larger than said first distance, and
   wherein said mirror first portion and said mirror second portion move independently of one another.

15. The system for imaging an object of claim 14, wherein each of said first and said second mirror portions move axially along said pivot axis independent of each other.

16. The system for imaging an object of claim 14, further comprising at least one actuator for respectively rotating one of said first and second mirror portions about said pivot axis.

17. The system for imaging an object of claim 16, further comprising at least one other actuator for translating said first and said second mirror portions along said pivot axis.

* * * * *